United States Patent
Liu et al.

(10) Patent No.: US 7,900,029 B2
(45) Date of Patent: *Mar. 1, 2011

(54) METHOD AND APPARATUS TO SIMPLIFY CONFIGURATION CALCULATION AND MANAGEMENT OF A PROCESSOR SYSTEM

(76) Inventors: Jason Liu, Shanghai (CN); Kevin Y Li, Shanghai (CN); James Tang, Shanghai (CN); Rahul Khanna, Portland, OR (US)

( * ) Notice: Subject to any disclaimer, the term of this patent is extended or adjusted under 35 U.S.C. 154(b) by 791 days.

This patent is subject to a terminal disclaimer.

(21) Appl. No.: 11/768,502

(22) Filed: Jun. 26, 2007

(65) Prior Publication Data

US 2009/0006828 A1    Jan. 1, 2009

(51) Int. Cl.
*G06F 15/177* (2006.01)
(52) U.S. Cl. .................. 713/1; 713/2; 713/100
(58) Field of Classification Search .......... 713/1, 2, 713/100
See application file for complete search history.

(56) References Cited

U.S. PATENT DOCUMENTS

| | | | |
|---|---|---|---|
| 5,664,195 A * | 9/1997 | Chatterji | 717/178 |
| 6,009,488 A | 12/1999 | Kavipurapu | |
| 6,823,429 B1 * | 11/2004 | Olnowich | 711/141 |
| 6,915,513 B2 * | 7/2005 | Duesterwald et al. | 717/168 |
| 2006/0010450 A1 * | 1/2006 | Culter | 718/104 |
| 2006/0095547 A1 * | 5/2006 | Cohn | 709/220 |
| 2006/0212660 A1 * | 9/2006 | Mattina | 711/146 |

OTHER PUBLICATIONS

United States Patent Application, pending, not yet published, U.S. Appl. No. 11/618,422, filed Dec. 22, 2006, to Nachimuthu et al.

* cited by examiner

*Primary Examiner* — Nitin C Patel
(74) *Attorney, Agent, or Firm* — David L. Guglielmi

(57) ABSTRACT

Methods and apparatus to simplify configuration calculation and management of a processor system are disclosed. An example disclosed method reads system configuration data from registers of a processing system, caches the system configuration data in an allocated memory, and calculates new system configuration data for the processing system by operating on cached data. Other embodiments are also disclosed and claimed.

7 Claims, 2 Drawing Sheets

METHOD AND APPARATUS TO SIMPLIFY CONFIGURATION CALCULATION AND MANAGEMENT OF A PROCESSOR SYSTEM

FIELD

The present disclosure relates generally to processor systems and, more particularly, to methods and apparatus to simplify configuration calculation and management of a processor system.

GENERAL BACKGROUND

The speed of business moves at an ever increasing rate due to the use of server computer systems. Furthermore, a down or halted server computer system may force a business to halt a critical system, which can cause large losses in productivity. Therefore, a server computer system requires high levels of reliability, availability and serviceability (RAS) features.

Typically, to enable implementation of RAS features, a server computer system needs to be reconfigurable. In many cases, RAS-related operations require changes to the system configuration such as, for example, adding memory, removing memory, adding a processor, removing a processor and recovering from failures while the operating system (OS) is running (i.e., in an OS transparent manner).

Some known server computer systems or processor systems provide an interrupt or OS cycle stealing mechanism that enables the OS to be put into a quiescent state (i.e. quiesces the OS) so that certain RAS features can be implemented (e.g., so that the system configuration can be changed) while the OS is running. In some of these known systems, the interrupt mechanism is referred to as a system management interrupt (SMI). However, due to realtime demands, the OS imposes system management interrupt (SMI) latency limitations. In other words, the OS limits the amount of time for which the OS can be held in a quiescent state to prevent or avoid compromising critical business services, OS timer tick loss, video and/or audio glitches, inter-process timeouts, etc. In addition, if errors occurred and are not detected during the calculation and update process, then the change in system configuration can not be referred back to an original state causing the system to become unstable.

BRIEF DESCRIPTION OF THE DRAWINGS

The invention may best be understood by referring to the following description and accompanying drawings that are used to illustrate embodiments of the invention.

DETAILED DESCRIPTION

Figure 1:
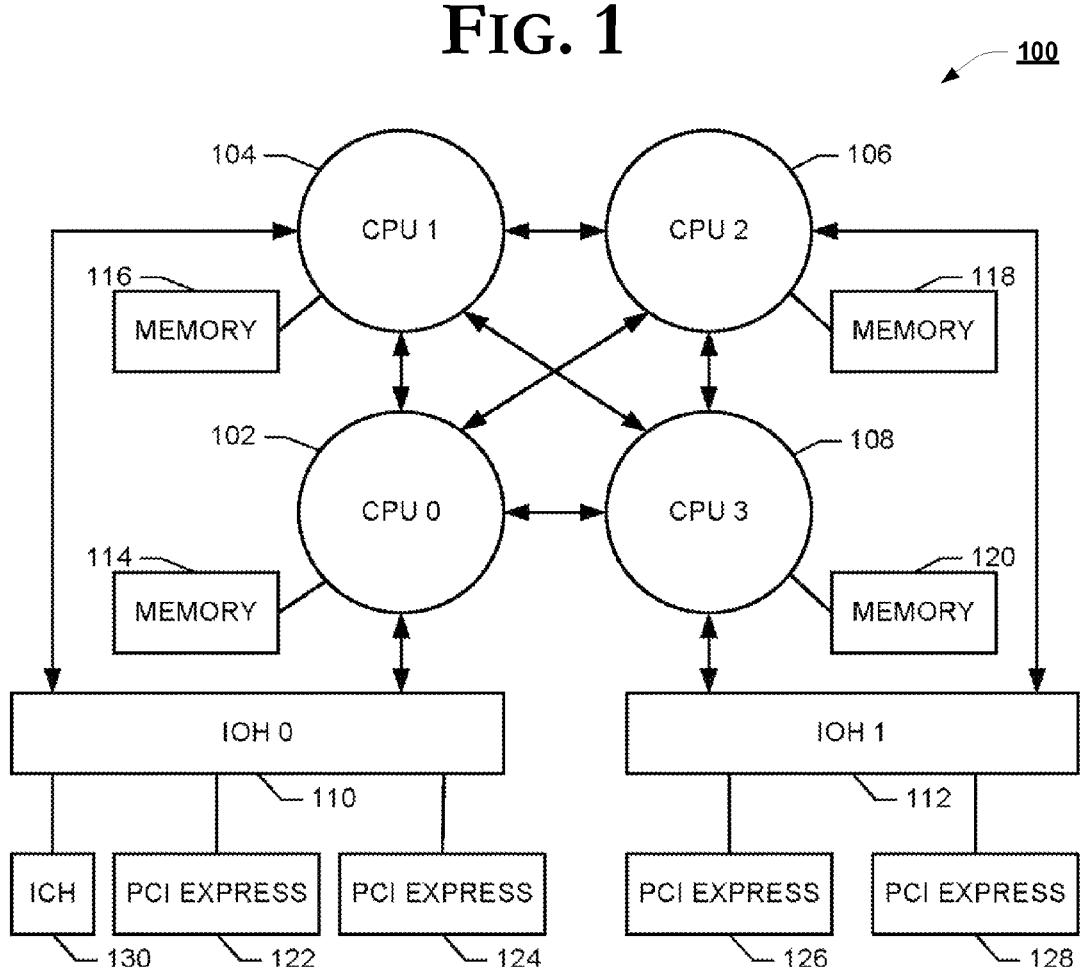
FIG. 1 is an example of a processor system having a point-to-point link based interconnection architecture in accordance with an embodiment of the invention.

FIG. 1 is an example of a processor system having a point-to-point link based interconnection architecture in accordance with an embodiment of the invention. The example in FIG. 1 is a link-based system 100 having four processors or processing units 102, 104, 106, and 108 and two input/output hubs (IOH's) 110 and 112. In addition, each of the processors 102, 104, 106, and 108 is operatively coupled to a respective memory controller 114, 116, 118, and 120. The IOH's 110 and 112 provide connectivity to input/output (I/O) devices such as PCI Express 122, 124, 126, and 128 and I/O controller hubs (ICH's) such as, for example, the ICH 130. System 100 can represent any type of computing device including a laptop, desktop, server, router, cell phone, personal data assistant, etc.

Communication among the processors 102, 104, 106, and 108 and communication between the processors 102, 104, 106, and 108 and the IOH's 110 and 112 are implemented using packets. Each of the components (e.g., the processors 102, 104, 106, and 108, the IOH's 110 and 112, etc.) contains a routing table (RT) and a source address decoder (SAD). The RT provides the packet routing information to other sockets, and the SAD provides a mechanism to represent routing of the resources such as memory, I/O, etc. The RT and SAD are comprised of hardware registers (not shown), some of them can be read directly, but some of them can not be read quickly. For example, some registers act as windows to operate low level hardware registers and to read these registers, other registers must first be written with particular values.

As is known, to implement configuration changes within the system 100 of FIG. 1 (e.g., to improve or change RAS features), forcing the various components of the system 100 into a quiesce state is typically required. For example, if the processor 108 in the FIG. 1 is to be removed for service while the OS of the system 100 is running, the RT's and SAD's associated with the remaining devices (e.g., the processors 102, 104, and 106 and the IOH's 110 and 112) should be reconfigured so that the entries related to the processor 108 and the memory 120 coupled to the processor 108 are removed, thereby eliminating the possibility of the system 100 attempting to route information to the processor 108 and/or its memory 120 while the processor 108 is removed for service.

Figure 2:
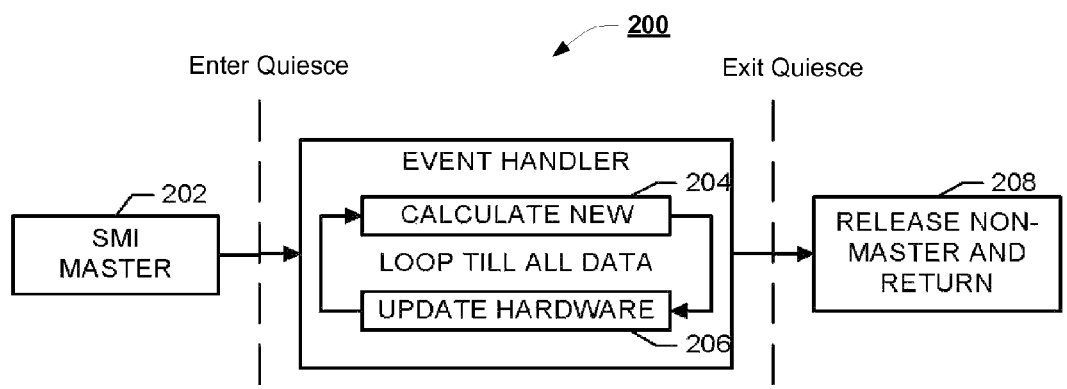
FIG. 2 depicts known technique to change a processor system configuration.

The components of the system 100 depicted in FIG. 1 support a quiesce (i.e., a quiescent) mode in which normal communications or traffic can be stopped to enable the RT and SAD change operations needed to carry out a configuration change or update. FIG. 2 depicts a known technique to change a processor system configuration within a processor system such as the example system 100 of FIG. 1. Continuing with the example involving the removal of the processor 108, when the processor 108 is to be removed from the system 100, a system management interrupt (SMI) is generated. In response to the SMI, one of the remaining processors (e.g., 102, 104, or 106) is selected as the master or monarch (depicted as processor 202 in FIG. 2) and is responsible to perform most, if not all, of the operations needed to complete the configuration change or update. In particular, the master processor 202 quiesces the whole system 100 and carries out the operations of an interrupt event handler 200. When performing the operations of the interrupt event handler 200, the master processor 202 calculates, for example, new system configuration register information or values at block 204 and updates the hardware devices of the system 100 by, for example, updating the RT's and SAD's associated with the devices to remain active in the system 100 at block 206. The calculations and updating associated with blocks 204 and 206 are performed until all required changes to the configuration data are calculated and instantiated within the associated hardware devices. Instead of operating on the configuration registers directly, however, the monarch CPU enrolls the register operations into a quiesce sequence data buffer and then the quiesce sequence data is applied to the whole system.

The quiesce sequence data buffer records all the registers operation sequence for new system configuration. Just register operations are stored, including values that need to be written to window registers to make other register values available to be operated on. In this way, the latest value of hardware register is calculated based on a non-retrieved current value of hardware register and all related register operations which are stored in the quiesce sequence data buffer.

While the master processor 202 carries out the operations of the interrupt event handler 200, the various devices making up the system 100 are maintained in a quiesce state. When the operations of the interrupt event handler 200 are complete, the master processor 202 releases the devices held in a quiesce state at block 208. As noted above, maintaining the devices (e.g., the processors 102, 104, and 106 and the IOH's 110 and 112) in a quiesce state for the duration of the calculation of the changed or updated configuration data in addition to the time required to update or change the configuration of the devices by instantiating the changed or updated configuration data, can result in violating the latency limitations associated with the system 100 which, in turn, can cause various failures and/or difficulties within the system 100 such as, for example, excessive interruption of critical business services, timer tick loss, video and/or audio glitches, inter-process timeouts, etc. Additionally, if errors are detected in the course of the event handler 200 calculating and updating hardware, the system 100 may become unstable because it may not be possible to roll back the configuration data to its original state before the updating began.

Figure 3:
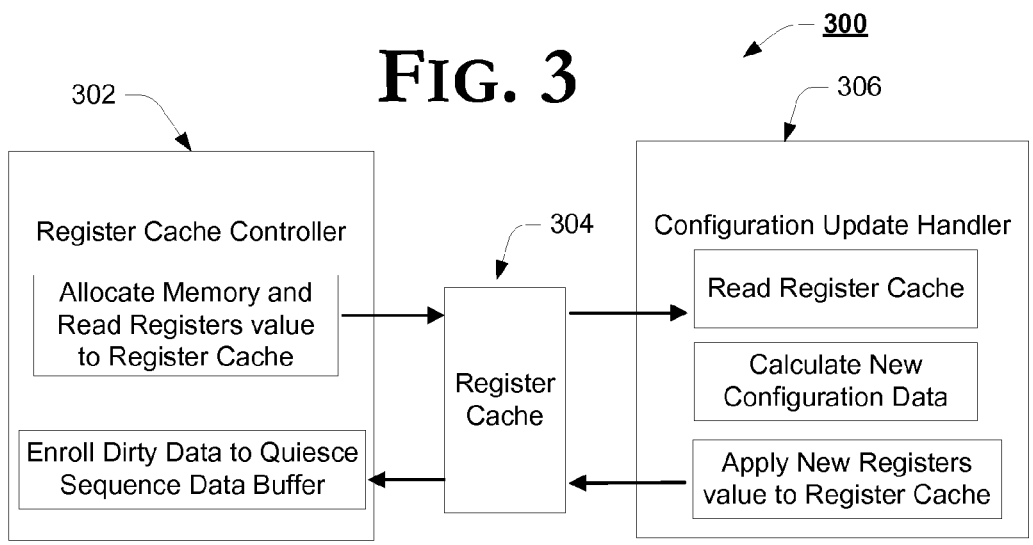
FIG. 3 is a block diagram depicting an example apparatus and method to simplify configuration calculation and management of a processor system in accordance with an embodiment of the invention.

FIG. 3 is a block diagram depicting an example apparatus and method to simplify configuration calculation and management of a processor system in accordance with an embodiment of the invention. Turning in detail to FIG. 3, the example apparatus includes a register cache controller 302, a register cache 304, and a configuration update handler 306, one or more of which may be implemented via code or software stored on a computer readable medium and executed by a processor such as, for example, one of the processors 102, 104, 106, or 108. For example, one or more integrated circuits, discrete semiconductor components, or passive electronic components may be used. Additionally or alternatively, some or all of the blocks of the example apparatus 300, or parts thereof, may be implemented using instructions, code, and/or other software and/or firmware, etc. stored on a machine accessible medium that, when executed by, for example, a processor system (e.g., the example processor system 100 of FIG. 1), perform the operations represented in the flow diagram of FIG. 4.

Figure 4:
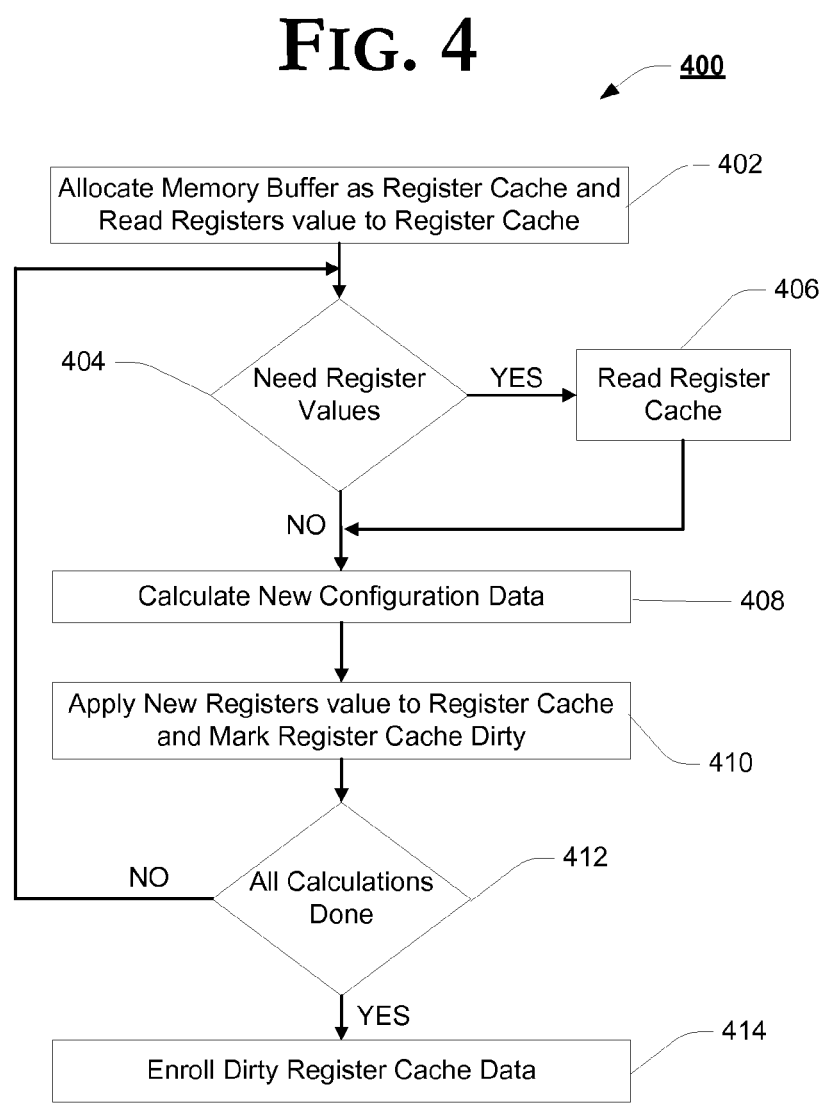
FIG. 4 is a flowchart depicting an example process that may be performed by the example apparatus of FIG. 3 in accordance with an embodiment of the invention.

To clearly illustrate the differences between the example technique depicted in FIG. 3 and the known technique depicted in FIG. 2, the foregoing example involving the removal of the processor 108 from the system 100 will be used in describing the operations carried out when employing the technique depicted in FIG. 3 and the related flowchart shown in FIG. 4. In general, as depicted in FIG. 3, the configuration manager 300, which may be implemented by the master or monarch processor (depicted as processor 202 in FIG. 2), calculates new or updated configuration information or data by operating on the actual values stored in the register cache 304 while the system 100 and its components are either in a non-quiesce state or a quiesce state. This greatly simplifies the quiesce sequence data buffer to include writing the new configuration data to the appropriate registers as opposed to the more lengthy sequence of performing operations to modify the existing configuration data.

Register cache controller 302 may allocate memory within system memory, for example memory 114, to maintain register cache 304. In one embodiment, register cache controller 302 reads the hardware registers, such as RT and SAD data, during a startup or boot sequence of system 100 and enters the data into register cache 304. In one embodiment, register cache 304 includes dirty bits that can be set when a value has been changed and needs to be written back as part of a new configuration. In one embodiment, in response to an interrupt, register cache controller 302 enrolls dirty data from register cache 304 to the quiesce sequence data buffer so that the new configuration settings can be written to hardware during the quiesce sequence.

Configuration update handler 306 responds to interrupts indicating a configuration is to be changed and makes the appropriate modifications to the configuration settings stored in register cache 304. In one embodiment, configuration update handler 306 operates during a quiesce state or non-quiesce state SMI. In another embodiment, configuration update handler 306 operates during a platform management interrupt (PMI). In one embodiment, after operating on data in register cache 304 to calculate new system configuration data for link-based multiprocessor system 100, configuration update handler 306 marks the modified cache entries as dirty, so that they may be enrolled in the quiesce sequence data buffer and written back to the associated registers.

FIG. 4 is a flowchart depicting an example process 400 that may be performed by the example configuration manager of FIG. 3. Initially, the process 400 allocates a memory buffer for use as a register cache and read the original registers value to register cache (block 402). In one embodiment, register cache controller allocates the memory and populates register cache 304 with the hardware register values during a system startup. At some later point, an interrupt associated with a configuration change may invoke configuration update handler 306 to determine if cached register values are needed (block 404). If so, configuration update handler 306 can read the values from register cache 304. Then, calculate (block 408) the new configuration data based on the cached values, and apply the new registers value to register cache and mark the updated register cache entries as dirty (block 410). Configuration update handler 306 would determine if all calculations are done (block 412) and would continue updating the system configuration data as necessary. After the calculations are complete, perhaps immediately or perhaps later during a subsequent interrupt, register cache controller 302 will enroll (block 414) the dirty register cache data of register cache 304 as write operations in a quiesce sequence data buffer so that the new system configuration data may be written during the quiesce sequence.

FIG. 4 described above depicts a flowchart representative of an example method that may be used to implement the example apparatus 300 of FIG. 3. In some example implementations, the example method of FIG. 4 may be implemented using machine readable instructions comprising a program for execution by a processor (e.g., the processor 102 shown in the example processor system 100 of FIG. 1). The program may be embodied in software stored on a tangible medium such as a CDROM, a floppy disk, a hard drive, a digital versatile disk (DVD), or a memory associated with the processor 102 and/or embodied in firmware and/or dedicated hardware in a well-known manner. Further, although the example program is described with reference to the flowchart illustrated in FIG. 4, persons of ordinary skill in the art will readily appreciate that many other methods of implementing the example apparatus 300 may alternatively be used. For example, the order of execution of the blocks may be changed, and/or some of the blocks described may be changed, eliminated, or combined.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. An apparatus comprising:
a register cache controller to maintain a register cache of system configuration data, including routing tables and source address decoders, for a link-based multiprocessor system; and
a configuration update handler to extract information from the register cache to calculate new system configuration data for the link-based multiprocessor system in response to a change in hardware.

2. The apparatus as defined in claim 1, wherein the configuration update handler calculates the new system configuration data during a quiesce state.

3. The apparatus as defined in claim 1, wherein the configuration update handler calculates the new system configuration data during a non-quiesce state.

4. The apparatus as defined in claim 1, further comprising the configuration update handler to mark cache entries containing new system configuration data as dirty.

5. The apparatus as defined in claim 1, further comprising the register cache controller to enroll dirty register cache data to a quiesce sequence data buffer.

6. The apparatus as defined in claim 1, wherein the register cache controller allocates memory to store the register cache.

7. The apparatus as defined in claim 1, wherein the register cache controller reads register data during a system startup.

* * * * *